Oct. 5, 1954    J. F. TURNER ET AL    2,690,721
STOKER MOTOR CONTROL
Filed May 12, 1948    7 Sheets-Sheet 1

FIG. 1.

Inventors
James F. Turner and
Christian P. Breidenbaugh

Attorney

Oct. 5, 1954     J. F. TURNER ET AL     2,690,721
STOKER MOTOR CONTROL

Inventors
James F. Turner and
Christian P. Breidenbaugh
Attorney

Patented Oct. 5, 1954

2,690,721

UNITED STATES PATENT OFFICE 2,690,721

STOKER MOTOR CONTROL

James F. Turner and Christian P. Breidenbaugh, Baltimore, Md., assignors to Flynn & Emrich Company, Baltimore, Md., a corporation of Maryland Application May 12, 1948, Serial No. 26,608

7 Claims. (Cl. 110—103)

This invention relates to solid fuel feeding and it is primarily directed to an overhead coal thrower type of feeder or stoker.

Heretofore such coal stokers have been operated by means of gears which involve serious limitations for accurate adjustment to feed the coal at the desired rate. Stokers of this kind are adapted to feed substantially any type of coal, either lump or pulverized and of course since such coals do vary over such a wide range, the adjustment of the stoker for the correct feeding of the available supply of coal is most important. The throwers are designed to throw the coal over the whole furnace grate and the bed plate for the pushers which forward the coal to the throwers is designed for accurate adjustment in relation to the throwers so that this equal distribution over the complete grate is effected. The coal is thrown out so that the large lumps go far into the furnace over the whole width and length of the fire grate and smaller particles fall nearer, and the finest particles are burned while still in suspension well above the grate of the furnace. The driving mechanism for the pushers is such as to yield at a predetermined set point in case of foreign matter being present in the coal to clog the operation of the pushers. This driving mechanism is, however, so adjusted as to build up an increased pressure above the normal operation pushing pressure to disintegrate any larger lumps of coal that reach the pushers.

The driving mechanism is preferably an electrical motor driven hydraulic pump which transmits its power to a hydraulic motor which in turn transmits its action to the pushers. One of the specific objects of the invention is to drive the throwers from the same motor which drives the pump and to make the adjustment of the speed of the throwers as readily controllable as is the speed of the hydraulic motor in the application of its power to the pushers. Another one of the objects of the invention is to make the speed of the pushers adjustable and to adjust that speed to the call for fuel to the furnace, as required by the demands on the boiler being heated.

The stoker of this invention is substantially noiseless and involves relatively few moving parts. All the operating parts of the furnace are cooled and air is introduced to the combustion chamber adjacent the introduction of the fuel.

By the use of a hydraulic motor a relatively small powered constant displacement pump may be used and power from that pump may be accumulated, or built up to exert tremendous pressure when required and yet when this greater pressure is not required the hydraulic motor may be operated at relatively low pressure with considerable economy of current over what would be required if the hydraulic motor were driven with its full force at all times. In order to obtain the possibility of this large accumulation of power, in the operation of the stoker, the hydraulic drive for the hydraulic motor is designed to bypass a portion of the hydraulic fluid from the pump so that the full power delivered from the pump is utilized on the hydraulic motor only when the maximum desired pressure is required for the pushers. At all other times a considerable portion of the fluid from the pump is bypassed and does not reach the hydraulic motor, it rather comes back to the pump reservoir for recirculation through the pump.

There being relatively few parts involved in the hydraulic drive, the wear on this part of the mechanism is negligible. The wear on the other parts of the mechanism, the pushers and the throwers and their intermediate driving mechanisms is so slight as also to be negligible and there has been produced a thrower stoker of quietness, simplicity and ease of operation and adjustment heretofore unknown in the art.

In the accompanying drawings the preferred embodiment of the invention has been illustrated. In these drawings.

In the drawings similar numerals refer to similar parts throughout the several views.

Figure 1:
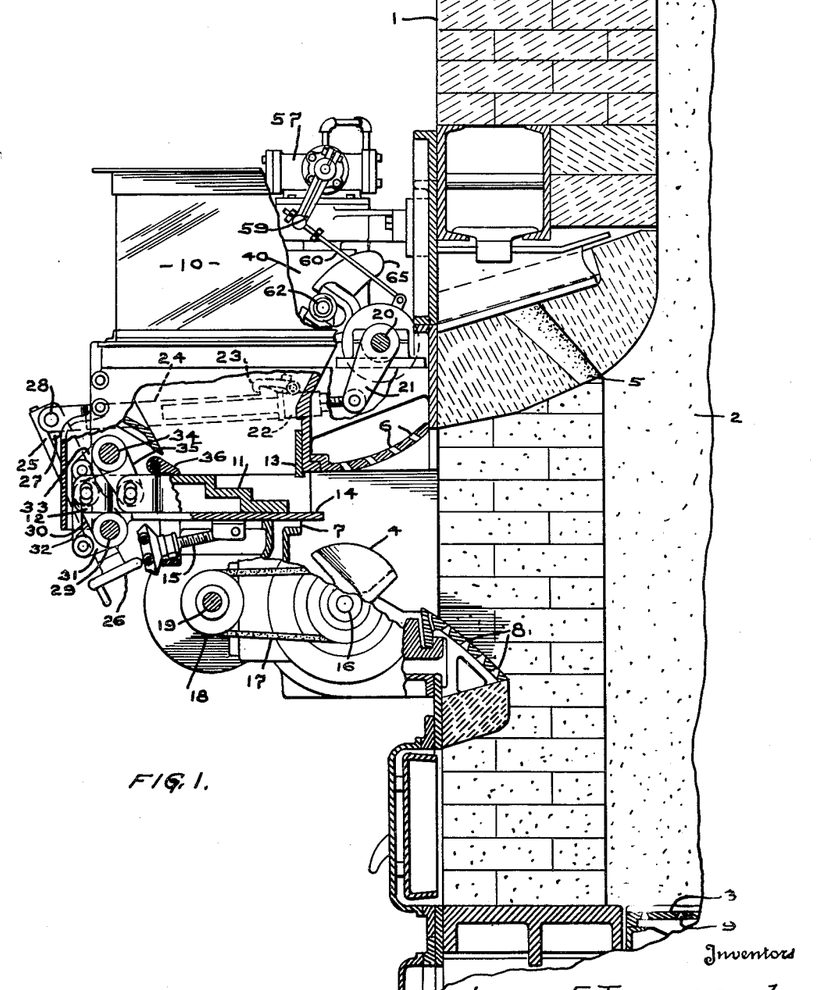
Figure 1 is a vertical sectional view through the front of the furnace showing the pushers and throwers and parts of their operating mechanism.

As shown in Figure 1 the furnace has a front 1 of firebrick and a burning or combustion chamber 2 with a grate 3 at its bottom. Both lump and powdered coal is thrown out into the furnace chamber by means of the constantly rotating throwers 4. These throwers are preferably arranged so that there are two at the front and they throw the coal out over the bed of burning fuel on grates 3 so that it spreads over the whole bed. Air is admitted to the front of the furnace through openings 5, 6, 7 and 8 and to the grates through openings 9. There is such an adequate supply of air that the fine particles of the coal burn in suspension in the furnace and only the larger particles and lumps fall to the grate 3.

Coal is fed to each of these throwers 4 from a hopper 10 in which the supply is maintained. The coal is forced from the hopper 10 by means of alternately spaced pushers 11 and 12 covering the whole bottom of the hopper. These pushers are stepped as shown, so that they substantially break up any larger lumps of coal against the forward edge 13 of the hopper. The trajectory plate 14 may be adjusted by means of screw 15 in its position at the bottom of the hopper beneath the pushers 11 and 12 so that it projects the desired distance over the throwers 4 so that they receive the coal at the desired point in their revolution to give it the throw required to reach the farthest point of the combustion chamber. This alternate operation of the pushers assures a constant supply of fuel to the screw shaped throwers 4 so that always some coal is being thrown by them. There is no puff with a sudden supply and then an intermission of supply as when only a single pusher is used. The throwers 4 having curved throwing faces, throw to both sides of the bed, and they are mounted on stub shafts 16 and there may be as many units of throwers and hoppers and pushers as the width of the furnace may suggest. Shaft 16 is driven through a pulley thereon and belt 17 and pulley 18 from shaft 19 which extends across the front of the furnace and may drive several stub shafts 16 in a similar manner.

The pushers are operated from a reciprocating shaft 20 likewise extending horizontally across the furnace parallel to shaft 19. To operate the pushers under the respective hoppers 10, an arm 21 transmits reciprocating power to rod 22 held fast by latch 23 to sheath 24 pivoted at its forward end to rocking arm 25, and the effective length of this rocking arm may be varied by means of a screw turned by handle 26 which moves the bearing 27 vertically in the arm 25 and in that bearing 27 the pivot 28 of the sheath 24 is fixed. Rocking arm 25 rocks stub shaft 29 which is directly attached through means of arm 30 to drive pusher 12. Shaft 29 also has thereon arm 31 which through link 32 and arm 33 rocks upper parallel stub shaft 34 which through arm 35 alternately reciprocates the other pusher 11. Riding on top of the pushers is a pivoted lip 36 which prevents any coal from being withdrawn from the front of the hopper by the retraction of the pushers. It will be apparent that when the latch 23 is released that the reciprocating rod 22 will simply slide back and forth in the sheath 24 and leave the pushers under this particular hopper 10 inoperative. The stroke of the pushers is of course regulated by regulating the effective length of the rocker arm 25 as above described.

Reciprocating motion is transmitted to the shaft 20 through the readily releasable connection 37 which connects this shaft to stub shaft 38 fixed in the projection 39 of the housing of the hydraulic motor 40.

Figure 2:
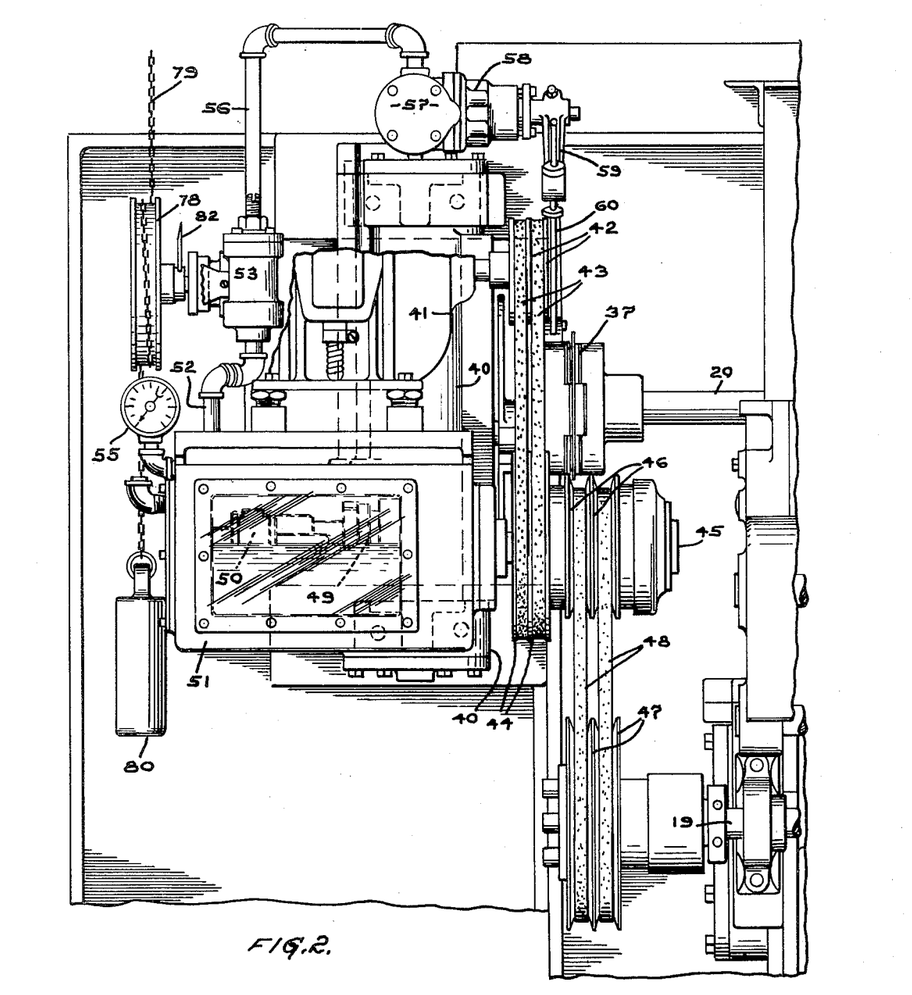
Figure 2 is a front elevational view of the driving means for the stoker.
Figure 3:
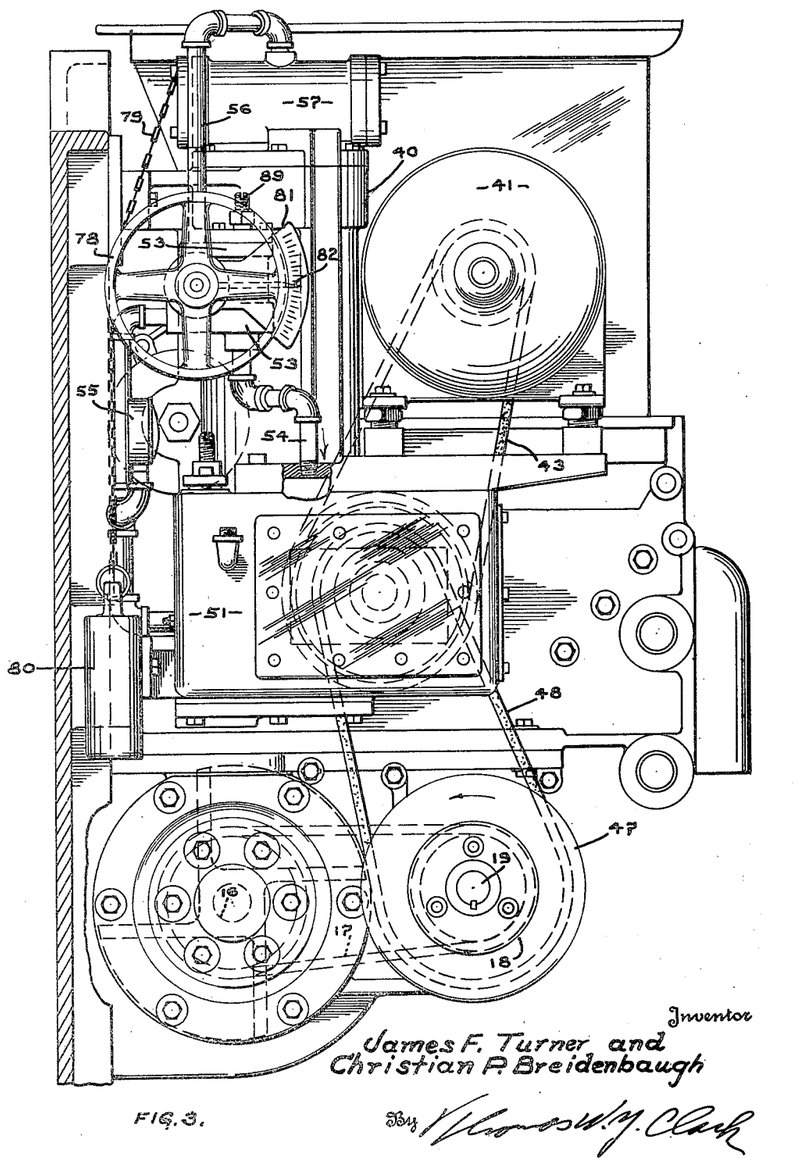
Figure 3 is a side elevational view of the same from the left.
Figure 4:
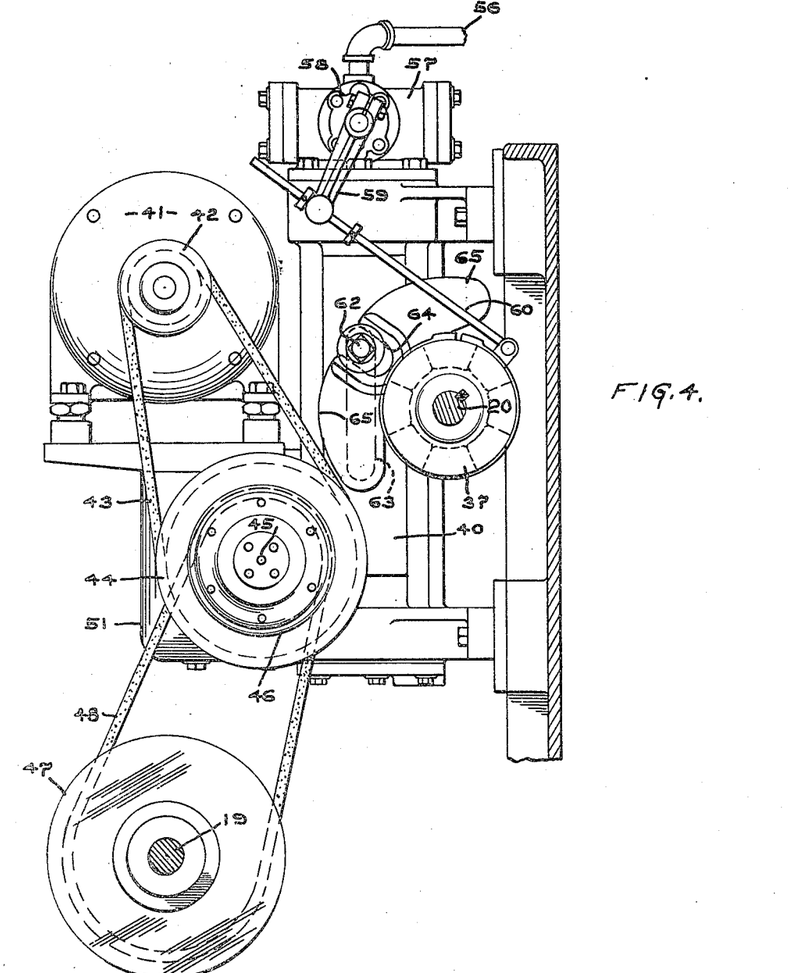
Figure 4 is a side elevational view of the same from the right.

The electric motor 41 is preferably the initial and the unitary source of power for operating both the hydraulic motor and the throwers. This motor is connected by means of sheaves 42 and belts 43 to sheaves 44 on shaft 45. Shaft 45 has thereon expanding pulleys 46 driving expanding pulleys 47 on shaft 19 by means of belts 48. The two sets of expanding pulleys can be adjusted in their pitch to give the desired relative speed to shaft 19 and thereby to adjust the speed of the throwers 4 as desired.

Figures 5, 6:
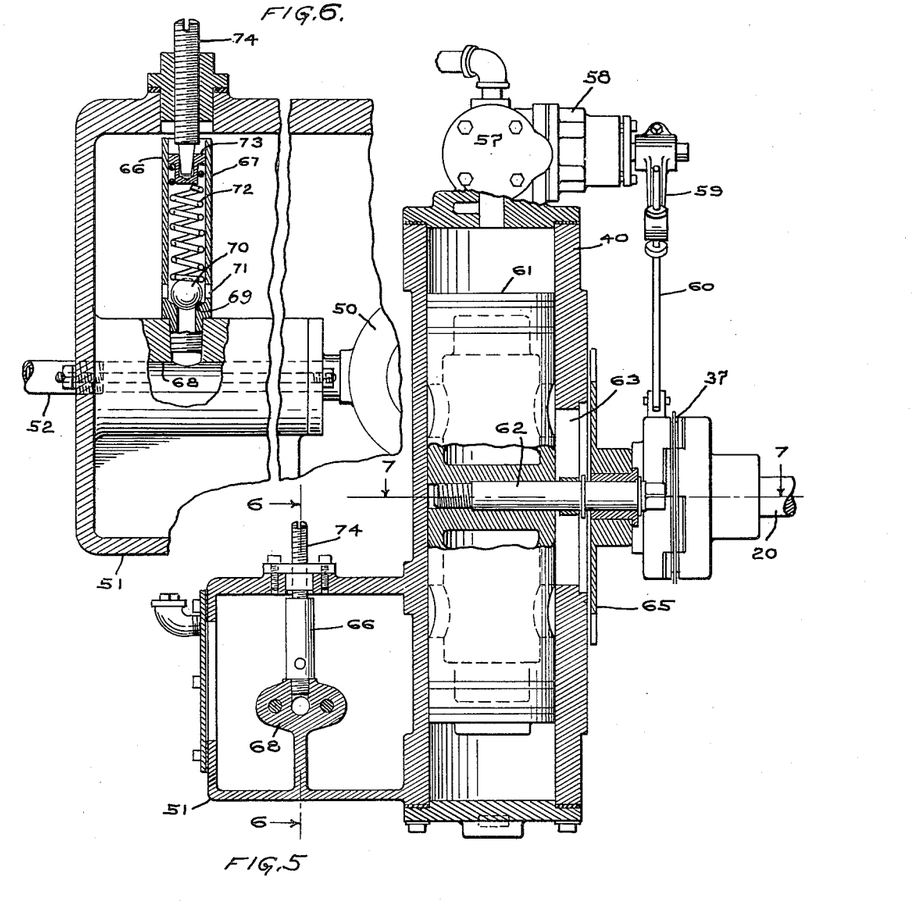
Figure 5 is a vertical sectional view of the hydraulic motor.
Figure 6 is a vertical sectional view on line 6—6 of Figure 5.
Figures 7, 8:
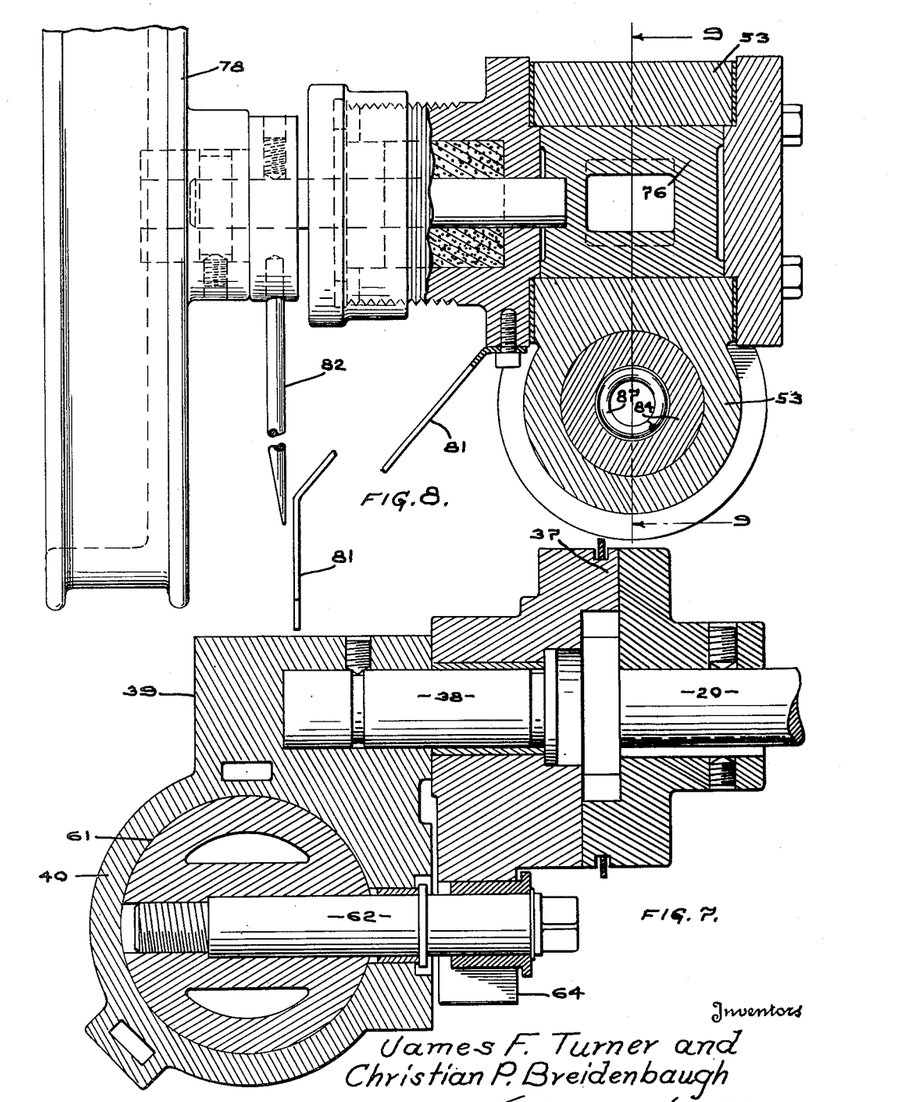
Figure 7 is a horizontal sectional view on line 7—7 of Figure 5.
Figure 8 is a horizontal sectional view of the regulating valve.

Shaft 45 through a releasable drive connection 49 drives constant displacement fluid pump 50, the intake end of which is mounted in the fluid in reservoir 51. The pressure side of the pump 50 discharges hydraulic fluid through the line 52 to the regulating valve 53. From this valve there is also an exhaust through line 54 to the hydraulic fluid reservoir 51. A fluid pressure gage 55 may be placed in this line from the pump to indicate the pressure of the fluid. From the valve 53 through line 56 fluid under pressure passes to the valve 57. This valve through means of pilot valve 58 and arm 59 reciprocated by rod 60 from shaft 20 alternately admits fluid under pressure to the respective ends of the hydraulic motor 40. The speed of the motor is determined by the pressure of the fluid admitted to its respective ends because it is reversed in action through means of the pilot valve 58 immediately, at each end of its stroke. The piston 61 of the hydraulic motor has in its center shaft 62 vertically reciprocating in slot 63 of the casing of the motor. The shaft 62 reciprocates yoke 64 attached to stub shaft 38. The yoke 64 has extending wings 65 thereon to constantly cover the slot 63. The precise construction of the valve 57 and pilot valve 58 are old in the art and form no part of this invention.

Before the fluid under pressure reaches the regulating valve 53 through line 52, it is preferably passed from the pump 50 to the pressure limiting valve 66. As is shown in Figures 3, 4, 5 and 6 the fluid reservoir 51 is in an integral casting with the casing of the hydraulic motor 40. The pressure limiting valve 66 is on the rear side of the fluid reservoir and it consists of a tubular member 67 screwed to an integral passage 68, integral with the reservoir 51. The tubular member 67 has therein a valve seat 69 on which ball 70 rests to close the valve. The tubular member 67 has openings 71 therein above the valve seat discharging to reservoir 51, and the ball is held on its seat by spring 72 held down by plug 73 and screw 74 passing through the top of the reservoir 51. The maximum pressure to be exerted upon the pushers through means of the hydraulic motor 40 by the pump 50 is determined by the adjustment of set screw 74.

Figures 9, 10:
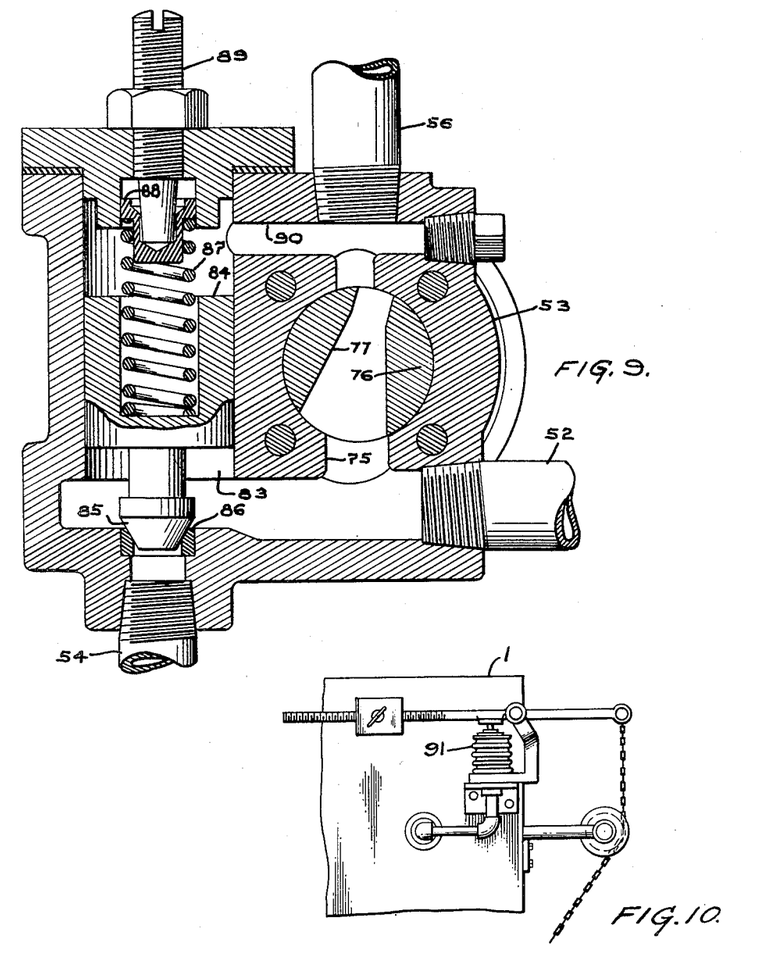
Figure 9 is a vertical sectional view of the regulating valve on line 9—9 of Figure 8.
Figure 10 is a fragmentary view of the steam pressure operating means.

The regulating valve 53 has within its casing a passage 75 which is larger at its entrance from line 52 from the pump than at its exit through line 56 to the hydraulic motor as shown in Figure 9. The fluid passing through this valve is regulated by the rotatable valve plug member 76 having a substantially V-shaped passage 77 therethrough as shown in Figure 9 and being large at its entrance and small at its exit. This valve member 76 is turned by pulley 78 around which winds chain 79 which is held in turning contact with the pulley 78 by weight 80 and vertical movements of this chain 79 are imparted to it by means 81 connected through the furnace 1 to the boiler responsive to the requirements on the boiler. A dial 81 and hand 82 indicate the position of the valve member 76.

Parallel to the passage 75 through the regulating valve 53 is a cylindrical opening 83 having a piston 84 floating therein. This piston has a bypass valve member 85 resting on valve seat 86 at its lower end so that when the piston is at its lowermost position no pressure fluid is bypassed from line 52 to return line 54, it is rather all passed up through the valve member 76. The top of the piston member 84 has therein an opening containing a spring 87 which applies a small amount of pressure through means of plug 88 held by set screw 89. The top or head of this piston is wholly exposed to the pressure of the fluid passing through valve member 76 before it exerts its full pressure through line 56, through opening 90 passing horizontally across the top of the valve 53. The bottom of the piston 84 has less area exposed to the pressure of the fluid, less by the amount of the cross sectional area of the stem of the bypass valve member 85. Since the passage 77 because of its shape receives a larger pressure from its lower side than it transmits, the upper and lower faces or ends of the piston 84 are so balanced under the pressure of the hydraulic fluid as to constantly raise the valve 85 slightly from its seat 86 to permit the bypass of a portion of the pressure fluid back to the pump reservoir 51. This is true with the normal operation of the pushers, with the normal feeding of coal.

However, when an obstruction is in the path of the pushers and the pressure backs up from the hydraulic motor, the greater area of the top of the piston 84 becomes effective to firmly push the valve 85 down upon its seat 86 and closes the valve. At this time the maximum pressure allowed by the pressure limiting valve 66 from the pump 50 is transmitted to the hydraulic motor 40 through passage 77 and then to the pushers to break the obstruction in the way. The spring 87 is primarily to prevent chatter and it is consequently relatively light in the pressure it exerts. Because of the unbalance between the area of the ends of the piston 84, the pressure exerted in the line to the motor is directly proportional to the back pressure from the motor.

It will be apparent that in operation the electric motor 41 is connected to drive both the fuel pump 50 and the thrower operating shaft 19, the fluid pump in turn passes fluid to the pressure limiting valve 66, through the regulating valve 53, through the valve and pilot valve 57 and 58 to the hydraulic motor 40, which in turn alternately reciprocates alternately operated pushers 11, 12 which push the fuel from the hopper 10 to the throwers 4 from which it is scattered over the furnace grate in the combustion chamber 2.

From this description it will be apparent that a most simple and sensitive fuel feeding apparatus has been developed which will feed substantially any type of coal that may be available and the regulation of the speed of feed can be sensitively controlled from the requirements made upon the boiler.

It will be apparent that many modifications may be made in the details of the construction shown without departing from the invention of the appended claims.

What is claimed as new and is desired to be secured by Letters Patent is:

1. A hydraulic drive for a stoker having fuel pushers, a constant displacement pump, a pressure line from the pump, a hydraulic motor connected to said line and operated by said pump, adapted to be operatively connected to the pushers, means, including a valve in the pressure line from the pump to the motor, responsive to the fuel demand on the stoker to vary the speed of the motor, means, including a cylinder open at both ends, one on each side of the valve, in the pressure line from the pump to the motor and a piston in the cylinder responsive at both ends to the pressure in the line to vary the pressure exerted by the motor through a predetermined range, a normally open bypass valve at one end of said cylinder, in the pressure line, having its closing member connected with one end of said piston, said piston having a compression spring at its other head end, tending to close the bypass valve, the area of the piston head end being greater than that of the bypass valve closing member connected end, whereby increased pressure in the line builds up a pressure on the larger area of the piston head and tends to close the bypass valve.

2. A hydraulic drive for a stoker having fuel pushers, a constant displacement pump, a pressure line from the pump, a hydraulic motor connected to said line and operated by said pump, adapted to be operatively connected to the pushers, means, including a valve in the pressure line from the pump to the motor, responsive to the fuel demand on the stoker to vary the speed of the motor, means, including a cylinder open at both ends, one on each side of the valve, in the pressure line from the pump to the motor and a piston in the cylinder responsive at both ends to the pressure in the line, to vary the pressure exerted by the motor through a predetermined range, a normally open bypass valve at one end of said cylinder in the pressure line having its closing member connected with one end of said piston, the area of the piston head, the end opposite the closing member connected end, being greater than that of the valve closing member connected end, whereby, increased pressure in the line builds up a pressure on the larger area of the piston head and tends to close the bypass valve.

3. A hydraulic drive for a stoker having fuel pushers, a constant displacement pump, a pressure line from the pump, a hydraulic motor connected to said line and operated by said pump, adapted to be operatively connected to the pushers, means, including a valve in the pressure line from the pump to the motor, responsive to the fuel demand on the stoker to vary the speed of the motor, means including a cylinder open at both ends, one on each side of the valve, in the pressure line from the pump to the motor and a piston in the cylinder responsive at both ends to the pressure in the line, to vary the pressure exerted by the motor through a predetermined range, a normally open bypass valve at one end of said cylinder in the pressure line having its closing member connected with one end of said piston, the area of the piston head, the end opposite the valve closing member connected end, being greater than that of the valve closing member connected end, and the respective piston end areas being so related to bypass a portion of the hydraulic fluid with normal pressure in the line, and increased pressure in the line building up a pressure on the larger area of the piston head, tending to close the bypass valve.

4. The drive of claim 3 including a spring at one end of the piston to constantly constrain it in one direction to limit chatter of the bypass valve.

5. A hydraulic drive for a stoker having fuel pushers, a constant displacement pump, means to limit the maximum pressure delivered by the pump, a pressure line from the pump, a bypass valve in said line, a hydraulic motor connected to said line and operated by said pump, adapted to be operatively connected to the pushers, valve means in said line responsive to the fuel demand on the stoker to automatically vary the speed of the motor, the opening through said valve means being substantially larger at its pressure inlet end than at its pressure discharge end, movable pressure varying means in said pressure line between the pump and motor connected to said bypass valve and having a larger area exposed to the pressure in the line adjacent the discharge end of said valve means than the area exposed to the pressure in the line adjacent the inlet end of said valve means, responsive to the pressure in the line to vary the pressure exerted by the motor through a predetermined range, said valve means and movable means being connected to render the pressure on the said movable pressure varying means subject to the pressure variations in the line between the pump and motor.

6. A hydraulic drive for a stoker having fuel pushers, a constant displacement pump, means to limit the maximum pressure delivered by the pump, a pressure line from the pump, a bypass valve in said line, a hydraulic motor connected to said line and operated by said pump, adapted to be operatively connected to the pushers, valve means in said line responsive to the fuel demand on the stoker to automatically vary the speed of the motor, the opening through said valve means being substantially larger at its pressure inlet end than at its pressure discharge end, movable pressure varying means in said pressure line between the pump and motor connected to said bypass valve and having a larger area exposed to the pressure in the line adjacent the discharge end of said valve means than the area exposed to the pressure in the line adjacent the inlet end of said valve means, responsive to the pressure in the line to vary the pressure exerted by the motor through a predetermined range, said pump delivering more fluid than is required for the normal operation of the motor, said bypass valve passing the surplus fluid to the intake side of the pump, the pressure exerted by the motor being varied by the movable pressure varying means directly proportionally to the pressure in the line to the motor by varying the passage of fluid through said bypass valve, said valve means and movable pressure varying means being connected to render the pressure on the said movable pressure varying means subject to the pressure variations in the line between the pump and motor.

7. A hydraulic drive for a stoker having fuel pushers, a constant displacement pump, means to limit the maximum pressure delivered by the pump, a pressure line from the pump, a bypass valve in said line, a hydraulic motor connected to said line and operated by said pump, adapted to be operatively connected to the pushers, valve means, including a valve in the pressure line from the pump to the motor, responsive to the fuel demand on the stoker to automatically vary the speed of the motor, the opening through said valve means being substantially larger at its pressure inlet end than at its pressure discharge end, movable means also in the pressure line from the pump to the motor connected to said bypass valve and having a larger area exposed to the pressure in the line adjacent the discharge end of said valve means than the area exposed to the pressure in the line adjacent the inlet end of said valve means, responsive to the pressure in the line on both sides of the valve to vary the pressure exerted by the motor through a predetermined range.

References Cited in the file of this patent

UNITED STATES PATENTS

| Number | Name | Date |
|---|---|---|
| 1,663,513 | Hawse | Mar. 20, 1928 |
| 1,825,279 | Miller | Sept. 29, 1931 |
| 1,983,416 | Terry | Dec. 4, 1934 |
| 2,055,579 | Larsen | Sept. 29, 1936 |
| 2,163,825 | Bros | June 27, 1939 |